United States Patent [19]

Triner

[11] Patent Number: 4,610,081
[45] Date of Patent: Sep. 9, 1986

[54] METHOD OF FABRICATING BATTERY PLATES FOR ELECTROCHEMICAL CELLS

[75] Inventor: James E. Triner, Euclid, Ohio

[73] Assignee: Gould, Inc., Rolling Meadows, Ill.

[21] Appl. No.: 762,912

[22] Filed: Aug. 5, 1985

[51] Int. Cl.[4] .................. H01M 4/04; B23K 35/24
[52] U.S. Cl. ........................ 29/623.1; 29/623.3; 228/243
[58] Field of Search ............... 29/623.1, 623.3; 228/58, 901, 233, 243

[56] References Cited

U.S. PATENT DOCUMENTS 3,791,871  2/1974  Rowley ..................... 136/100 R
3,976,509  8/1976  Tsai et al. .................. 136/154
4,007,057  2/1977  Littauer et al. ............. 429/57
4,056,885  11/1977 Rao ............................ 29/623.1
4,188,462  2/1980  Klootwyk .................... 429/68

Primary Examiner—Donald L. Walton
Attorney, Agent, or Firm—Wood, Dalton, Phillips Mason & Rowe

[57] ABSTRACT

A process for pressure bonding a consumable, reactive metal anode plate to a bipolar plate for use in an electrochemical cell. Pressure is applied to the anode plate in a given direction progressively over a given area to mechanically bond that area of the anode plate to the bipolar plate, thereby forcing out any trapped air from in between the plates.

25 Claims, 6 Drawing Figures

METHOD OF FABRICATING BATTERY PLATES FOR ELECTROCHEMICAL CELLS

BACKGROUND OF THE INVENTION

1. Field of the Invention

This invention relates generally to electrode structures useful in electrochemical cells and, more particularly, this invention relates to a process for pressure bonding a consumable, reactive metal anode plate to a bipolar plate.

2. Description of the Prior Art

Electrochemical cells utilizing consumable, reactive metal anodes are well known. Typically, the anode comprises an alkali metal, such as lithium, in elemental, compound or complex form, in conjunction with a cathode and an aqueous or non-aqueous electrolyte. The electrolyte normally comprises an aqueous solution of lithium hydroxide.

Such cells are described in detail in numerous patents and publications, including U.S. Pat. Nos. 3,791,871 (Rowley); 3,976,509 (Tsai et al); 4,007,057 (Littauer et al); and 4,188,462 (Klootwyk), the details of the respective disclosures being incorporated herein by reference.

The anode typically is in the form of a disc, plate or other structure having at least one surface which contacts the electrolyte during operation, and an opposite surface which is bonded to a bipolar plate. The bipolar plate typically is of nickel, copper or alloys of other metals and the cathode is bonded to the opposite side thereof to form a bipolar battery plate.

Previous bonding techniques have used flat platens or presses to pressure bond a lithium foil anode directly to a mechanically abraded nickel foil bipolar plate, with a cathode plate bonded to the other side of the bipolar plate, thereby forming a battery plate for use in electrochemical cells. This method often produced a poorly bonded lithium foil anode. In some instances, the actual bonding was estimated at less than 25% of the active area. One of the major causes for such a poor bond has been the entrapment of air between the lithium foil anode and the metal foil bipolar plate.

This invention is directed to the above problems by providing a new bonding technique which ensures substantially 100% bonding of the lithium anode to the bipolar battery plate.

SUMMARY OF THE INVENTION

An object, therefore, of the invention is to overcome the problems described above by providing a new and improved process for pressure bonding a consumable, reactive metal anode plate to a bipolar plate for use in an electrochemical cell.

In the exemplary embodiment of the invention, pressure is applied to the anode plate in a first area to mechanically bond that area of the anode plate to the bipolar plate. Pressure then is applied seriatim to other areas of the anode plate leading away from the first area to progressively mechanically bond those areas of the anode plate to the bipolar plate, thereby forcing out any trapped air from between the plates.

Preferably, pressure is applied to the first area at a location generally centrally of the anode plate, such as an area which is generally circular in shape. Pressure subsequently is applied seriatim to the other areas at locations radiating outwardly from the circular central area, such as in generally ring shaped areas of progressively increasing diameters. The central circular area and the progressively increasing diameter ring areas each are substantially equal in size in order to apply a substantially equal bonding pressure to the anode plate against the bipolar plate. In other words, when using a die that applies a constant force, by applying that force sequentially to equal areas of the anode plate, a constant bonding pressure is applied throughout the entire area of the anode.

An alternate process would be to apply the pressure first to a given area of the anode and then to other areas progressively by a rolling operation, thereby forcing out any trapped air from between the plates.

Another feature of the invention contemplates sandwiching the anode plate between the bipolar plate and a separator means. Pressure is applied in the steps outlined above to the separator means to press the separator means into the anode plate in a single operation. This feature of the process enables the fabrication of battery plates which are used in series and separated for the flow of electrolyte therebetween.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

As is well known in the art, a reactive metal electrochemical cell generally comprises an anode of a reactive metal, a cathode, and an aqueous or non-aqueous electrolyte which contacts at least a portion of the anode and the cathode during operation of the cell. Each of the anode and cathode are connected to a terminal, and the respective terminals are connected to a load during operation.

The anode typically is of an alkali metal such as sodium, for example, and preferably is of lithium. The anodic metal may be present in elemental, compound, or complex form, as is well known in the art.

The cathode may be of any suitable metal, such as iron or silver oxide (AgO), for example, or may be a gas-consuming cathode such as an air cathode.

The anode and the cathode are spaced from each other either by a mechanical separator, which may be a catalyst, or merely by the metallic hydroxide film which invariably forms on the anode by exposure to humid air.

Figure 1:
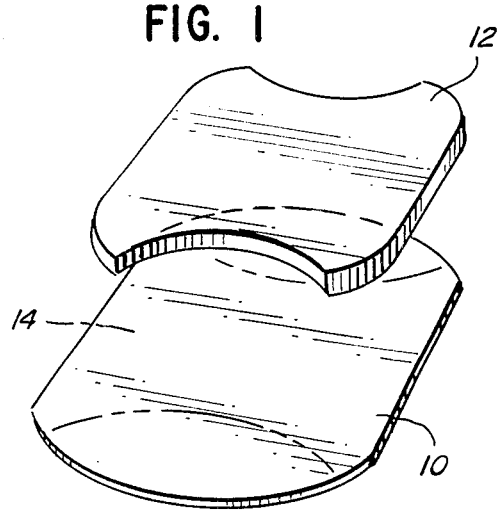
FIG. 1 is an exploded perspective view of a typical bipolar battery plate using a reactive metal anode plate.

FIG. 1 shows a bipolar battery plate for use in an electrochemical cell and includes a bipolar plate 10, such as of nickel foil, for example, an anode plate 12, such as of lithium foil, and a cathode plate 14, such as of silver oxide. The anode and cathode are bonded to opposite sides of the bipolar plate.

Figure 2A:
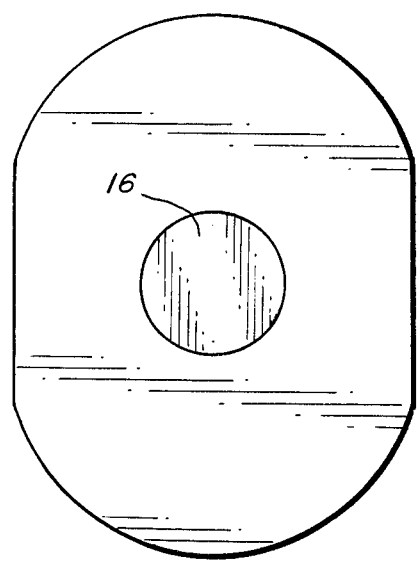
FIG. 2A is a plan view illustrating the location of a pressure shim for applying bonding pressure to a central area of the plate.
Figure 2B:
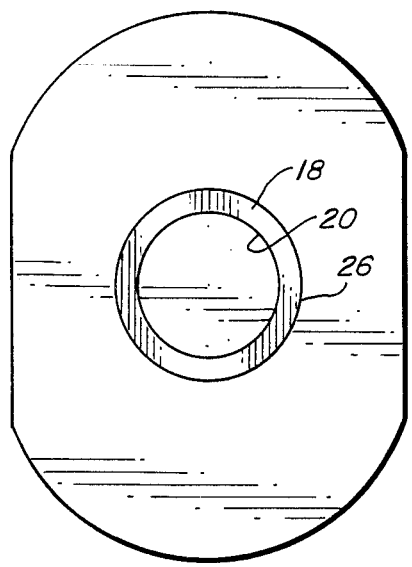
FIG. 2B is a view similar to that of FIG. 2A showing a concentric ring-shaped shim for applying pressure to the plate in an area radiating outwardly from the central area.
Figure 2C:
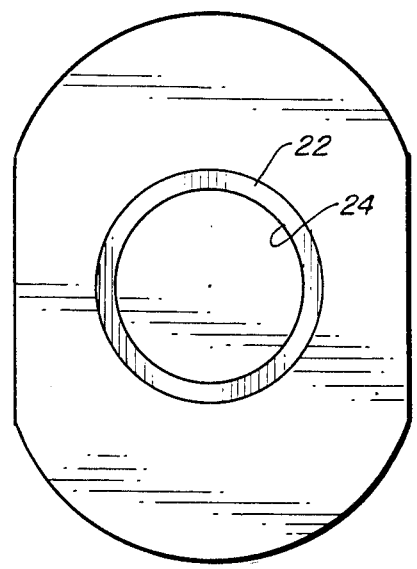
FIG. 2C is a view similar to that of FIGS. 2A and 2B, showing a sequentially larger ring-shaped shim for applying pressure to the plate in a radial area of progressively increasing diameter.

FIGS. 2A-2C illustrate a preferred form of applying pressure to the anode plate in a process for pressure bonding the consumable reactive metal anode plate to the bipolar plate. Generally, pressure is applied to the anode plate in a given direction progressively over a given area to mechanically bond that area of the anode plate to the bipolar plate and to force out any trapped air from between the plates. Preferably, the pressure is applied by a press die which applies a constant force. In FIGS. 2A-2C, pressure first is applied to the anode plate in a first, generally centrally located area defined by a generally circular shim 16 (FIG. 2A). Pressure then is applied seriatim to other areas of the anode plate leading away or radiating outwardly from the first area. For instance, FIG. 2B shows a ring-shaped shim 18 which has an inner diameter 20, the same as the outer diameter of circular shim 16. After applying pressure to shim 18, pressure then is applied to a concentric ring-shaped shim 22 (FIG. 2C) which has an inner diameter 24 the same as the outer diameter 26 of shim 18 (FIG. 2B). This sequence of steps is continued by using further concentric ringshaped shims of progressively increasing diameters.

In order to apply constant pressure throughout the entire area of the anode for pressure bonding the anode to the bipolar plate, each of shims 16, 18 and 22 (as well as any further increasing diameter shims) are equal in area. This can be seen by comparing the width of shims 18 and 22 in FIGS. 2B and 2C, respectively, where shim 22 is shown of a narrower width than that of shim 18 in order to provide equal pressure areas and thereby constant pressure in response to a constant applied force.

Furthermore, it can be seen in FIGS. 1-2C that the outer peripheries of the bipolar plate and the anode plate are irregularly shaped (i.e. non-circular). Circular shims are equally effective with such irregular shapes (versus circular plates), as long as at least a minimum pressure is applied, such as on the order of 1,000 psi.

An alternate process for bonding the anode plate to the bipolar plate contemplates applying the pressure by a rolling operation. In other words, the pressure would be applied to the anode plate in a given direction progressively over a given area by a pressure roll. This would ensure forcing out any trapped air from between the plates and effect a substantially 100% bond between the lithium foil anode and the metal foil bipolar battery plate.

Figure 3:
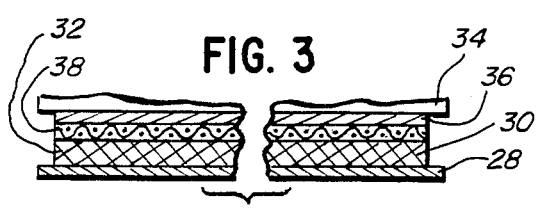
FIG. 3 is a fragmented section of a typical electrochemical cell using separator means between the battery plates.

The process of this invention is applicable for directly fabricating a composite electrode. More particularly, referring to FIG. 3, a bipolar plate or nickel foil 28 has an anode plate or lithium foil 30 on one side thereof, and a cathode (not shown) on the other side. A composite electrode is formed by a screen or foam 32 throughout the lithium anode. The battery plates normally are stacked in series, and a second bipolar plate 34 has a cathode 36 on the side thereof facing anode 30. Separator means in the form of a spacer screen 38 is disposed between each cathode 36 and anode 30 for the flow of electrolyte between the battery plates. The process contemplates applying pressure in the steps outlined above to press the separator screen directly into the lithium anode in one operation.

Figure 4:
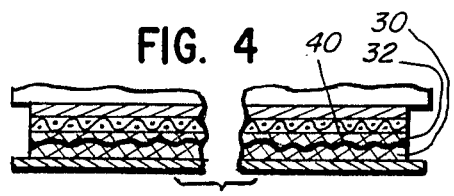
FIG. 4 is a view similar to that of FIG. 3, but illustrating a certain degree of anode erosion.

FIG. 4 illustrates screen 32 of the composite electrode exposed after lithium anode 30 has uniformly eroded during operation of the cell, as indicated by an erosion line 40.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A process for pressure bonding a consumable, reactive metal anode plate to a bipolar plate for use in an electrochemical cell, comprising the steps of:
    applying pressure by means of a constant force press to the anode plate in a first area to mechanically bond that area of the anode plate to the bipolar plate; and
    applying pressure seriatim by said press to other areas of the anode plate leading away from said first area to progressively mechanically bond those areas of the anode plate to the bipolar plate, thereby forcing out any trapped air from between the plates.

2. The process of claim 1 wherein said first area and said other areas each are substantially equal.

3. The process of claim 1, including the step of sandwiching the anode plate between the bipolar plate and a separator means, and applying pressure in said steps to the separator means to press the separator means into the anode plate in a single operation.

4. The process of claim 3 wherein said separator means is provided as a spacer screen.

5. The process of claim 1 wherein said anode plate is provided of lithium.

6. The process of claim 5 wherein said bipolar plate is provided of nickel or copper.

7. The process of claim 1 wherein the pressure is applied first to said first area and then to said other areas by a rolling operation.

8. A process for pressure bonding a consumable, reactive metal anode plate to a bipolar plate for use in an electrochemical cell, comprising the steps of:
    applying pressure to the anode plate in a first area at a location generally centrally of the anode plate to mechanically bond that area of the anode plate to the bipolar plate; and
    applying pressure seriatim to other areas of the anode plate at locations radiating outwardly of the central area to progressively mechanically bond those areas of the anode plate to the bipolar plate, thereby forcing out any trapped air from between the plates.

9. The process of claim 8 wherein said first area is generally circular in shape and said other areas are generally ring-shaped of progressively increasing diameters.

10. The process of claim 9 wherein said circular area and said ring-shaped areas each are substantially equal.

11. A process for pressure bonding a consumable, reactive metal anode plate to a bipolar plate for use in an electrochemical cell by applying pressure by means of a constant force press to the anode plate sequentially over a plurality of discrete planar areas to mechanically bond the areas to the bipolar plate and to force out any trapped air from between the plates.

12. The process of claim 11 wherein the pressure is applied in a rolling operation.

13. The process of claim 11 wherein said anode plate is provided of lithium.

14. The process of claim 13 wherein said bipolar plate is provided of nickel or copper.

15. The process of claim 11, including the step of sandwiching the anode plate between the bipolar plate and a separator means, and applying said pressure to the separator means to press the separator means into the anode plate in a single operation.

16. A process for pressure bonding an anode plate to a bipolar plate for use in an electrochemical cell, comprising the steps of:
provideing a consumable, reactive metal anode plate;
providing a metallic bipolar plate;
placing said plates in juxtaposition;
applying pressure to a first area of the anode plate at a generally central location to mechanically bond that area of the anode plate to the bipolar plate; and
applying pressure seriatim to a series of radial areas of the anode plate leading outwardly away from said first area to progressively mechanically bond the radial areas of the anode plate to the bipolar plate, thereby forcing out any trapped air from between the plates.

17. The process of claim 16 wherein said first area is generally circular in shape and said radial areas are generally ring shaped of progressively increasing diameters.

18. The process of claim 17 wherein said circular area and said ring shaped areas each are substantially equal.

19. The process of claim 16 wherein said first area and said radial areas each are substantially equal.

20. The process of claim 16 wherein said anode plate is provided of lithium.

21. The process of claim 16, including the step of sandwiching the anode plate between the bipolar plate and a separator means, and applying pressure in said steps to the separator means to press the separator means into the anode plate in a single operation.

22. The process of claim 21 wherein said separator means is provided as a spacer screen.

23. The process of claim 16 wherein said pressure is applied to said first area and then to said radial areas by a constant force press and a plurality of complementarily shaped shims, and including the steps of sequentially positioning and then removing each shim for each pressure applying step to maintain constant surface area pressure during each step.

24. The process of claim 16 wherein said bipolar plate is of a metal selected from the group consisting of nickel and copper.

25. A process for pressure bonding a consumable, reactive metal anode plate to a bipolar plate for use in an electrochemical cell by applying pressure to the anode plate progressively over a given area in a direction radially outwardly from a generally central location of the anode plate to mechanically bond that area of the anode plate to the bipolar plate and to force out any trapped air from between the plates.

* * * * *